United States Patent [19]
Hadley et al.

[11] 3,771,733
[45] Nov. 13, 1973

[54] FEED GRINDING APPARATUS

[75] Inventors: Howard C. Hadley, Dallas Center; Harold Richard Lindstrom, Des Moines, both of Iowa

[73] Assignee: Deere & Company, Moline, Ill.

[22] Filed: July 3, 1972

[21] Appl. No.: 268,884

[52] U.S. Cl............... 241/186 R, 241/73, 241/194, 241/292.1
[51] Int. Cl. ...................... B02c 11/04, B02c 13/04
[58] Field of Search ..................... 241/186 R, 101.5, 241/101.7, 73, 188 R, 193–195, 291, 292.1, 186.2, 186.3

[56] References Cited
UNITED STATES PATENTS

| | | | |
|---|---|---|---|
| 1,928,887 | 10/1933 | Gredell | 241/73 |
| 1,975,406 | 10/1934 | Reschke | 241/101.5 X |
| 2,181,397 | 11/1939 | Everett | 241/186 R UX |
| 2,654,986 | 10/1953 | Gold | 241/194 UX |
| 3,129,739 | 4/1964 | Wenger | 241/186 R X |
| 3,491,815 | 1/1970 | Thompson | 241/186 R X |
| 3,527,417 | 9/1970 | Thompsett | 241/101.7 |
| 3,680,797 | 8/1972 | Covey | 241/73 |

*Primary Examiner*—Granville Y. Custer, Jr.
*Assistant Examiner*—Howard N. Goldberg
*Attorney*—H. Vincent Harsha et al.

[57] ABSTRACT

Apparatus for grinding both baled hay and small grains including a rotor having a combination of swinging hammers and fixed knives, a housing for the rotor with an opening at its forward side to admit material thereinto, a material-receiving chamber on the front side of the housing having a bale opening at its front side and a grain opening at its top side, a conveyor selectively operable to convey a bale rearwardly through the chamber and into the rotor housing, and a partition removably positionable in the chamber to extend downwardly and rearwardly from a point forwardly of the grain opening to the lower edge of the opening in the rotor housing, the partition when so positioned being operable to deflect grain deposited through the grain opening downwardly and rearwardly through the chamber and into the rotor housing. A vertically adjustable gate is included at the upper edge of the housing opening to control the height of the opening, the gate being raised for grinding bales and lowered for grinding grain. A shaft having a plurality of radially extending fingers thereon is mounted forwardly of the upper edge of the housing opening and is operative to engage and feed rearwardly through the opening the upper portion of a bale as the latter is conveyed rearwardly through the chamber.

13 Claims, 4 Drawing Figures

PATENTED NOV 13 1973 3,771,733

FEED GRINDING APPARATUS

BACKGROUND OF THE INVENTION

The present invention relates generally to feed grinding apparatus and more particularly to such apparatus adapted to grind both baled hay and small grains.

A conventional hammer mill adapted for grinding grain comprises a rotor including a shaft having a plurality of swinging hammers mounted thereon, the rotor being enclosed within a housing having a hopper attached thereto for receiving grain and directing the same into the housing. Conventional bale shredding apparatus, on the other hand, comprises a relatively large diameter rotor including a shaft with a plurality of fixed, sharpened knives mounted thereon, the rotor being enclosed within a housing having a platform attached thereto for feeding bales toward the rotor. While a hammer mill is not capable of shredding baled hay, neither is a conventional bale shredder capable of grinding small grains.

When preparing feed in a grinder-mixer, it is often desired to include hay as one of the feed constituents. Since the hammer mill grinding apparatus conventionally included on such grindermixers is incapable of grinding hay in baled form, it has been necessary in the past to initially break up the bale into small individual slices and manually feed the slices into the hammer mill hopper. To obtain proper feeding of the slices through the hopper, it has been necessary to employ a separate feed roll attachment on the hopper to engage the bale slices and positively convey them into the hammer mill housing.

To facilitate the grinding of hay in such conventional grinder-mixers, separate baled hay shredding attachments have been made available for such machines so that whole bales can be shredded, thereby eliminating the necessity of first breaking the bale into small slices. Such attachments have taken the form of conventional bale shredding apparatus described above, in that they comprise a separate, fixed knife rotor mounted on the machine ahead of the normal hammer mill. It will be appreciated that such attachments substantially and undesirably increase the cost of the machine.

SUMMARY OF THE INVENTION

It is, accordingly, a primary object of the invention to provide a low cost feed grinding apparatus capable of grinding both grain and whole bales of hay.

More particularly, it is an object of the invention to provide such grinding apparatus having only a single rotor capable of grinding both grain and whole bales.

It is a further object to provide such apparatus which is capable of quick and easy conversion between its grain and bale grinding configurations.

In pursuance of these and other objects, the invention comprises, generally, a rotor including a shaft mounted for rotation about a transverse horizontal axis and having a plurality of both swinging hammers and fixed knives mounted thereon, a housing for the rotor having an opening in its forward side to admit material thereinto, a material-receiving chamber on the front side of the housing defined by upright side walls and a floor extending forwardly from the opening in the housing, the chamber having a bale opening at its front side and a grain opening at its top side, means selectively operable to convey bales rearwardly along the floor of the chamber and into the rotor housing, and a partition removably positionable in the chamber to extend downwardly and rearwardly from the front side of the grain opening to the bottom edge of the opening in the rotor housing, the partition being operative when so positioned to deflect grain deposited through the grain opening downwardly and rearwardly into the rotor housing. The removable partition comprises a panel swingably mounted in the chamber near the front side of the grain opening for movement between a downwardly and rearwardly inclined position a generally horizontal position, the panel in the latter position substantially closing the grain opening at the top side of the chamber. A vertically adjustable gate is mounted in the rotor housing to control the height of the opening therein, the gate being raised to provide a maximum height opening for bales and lowered to prevent rejection of grain by the rotor. A bale feeder apparatus, comprising a transverse shaft mounted adjacent to the top edge of the housing opening and having a plurality of radially extending fingers thereon, is operative to engage the top portion of the bale and feed it rearwardly through the opening as the bale is advanced rearwardly through the chamber.

BRIEF DESCRIPTION OF THE DRAWINGS

The preferred embodiment of the invention will be described in conjunction with the accompanying drawings in which.

DESCRIPTION OF THE PREFERRED EMBODIMENT

Figure 1:
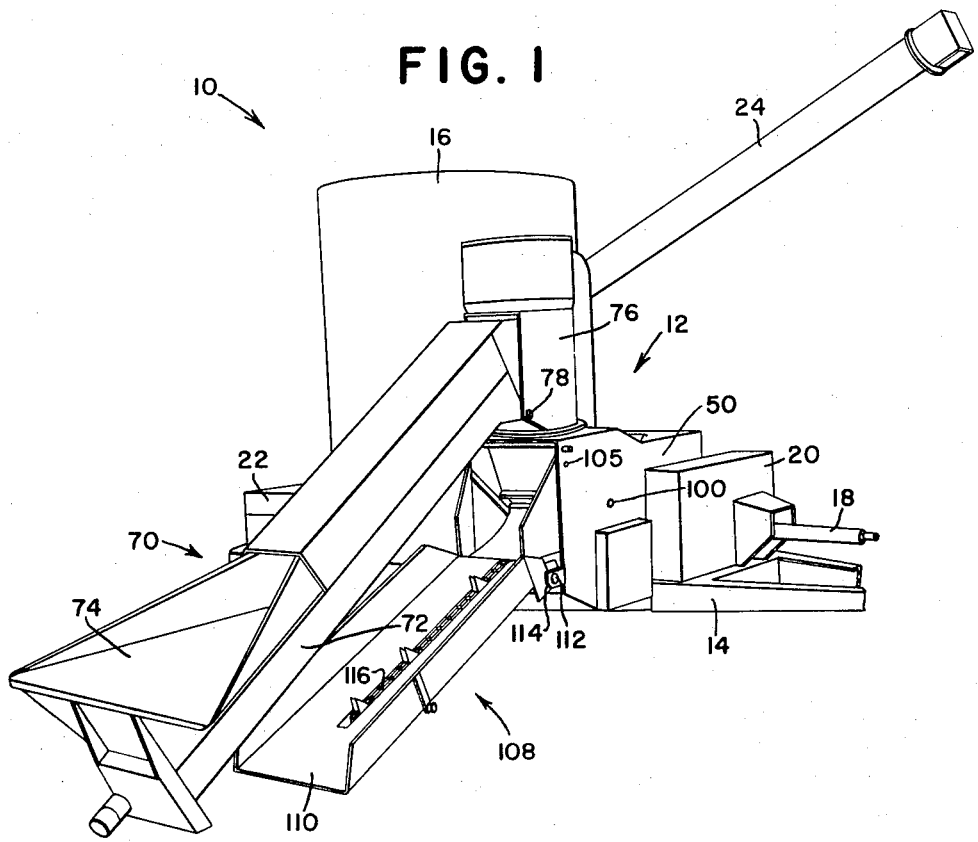
FIG. 1 is a right front perspective view of a grinder-mixer incorporating the feed grinding apparatus of the invention, the latter being arranged to grind grain.
Figure 2:
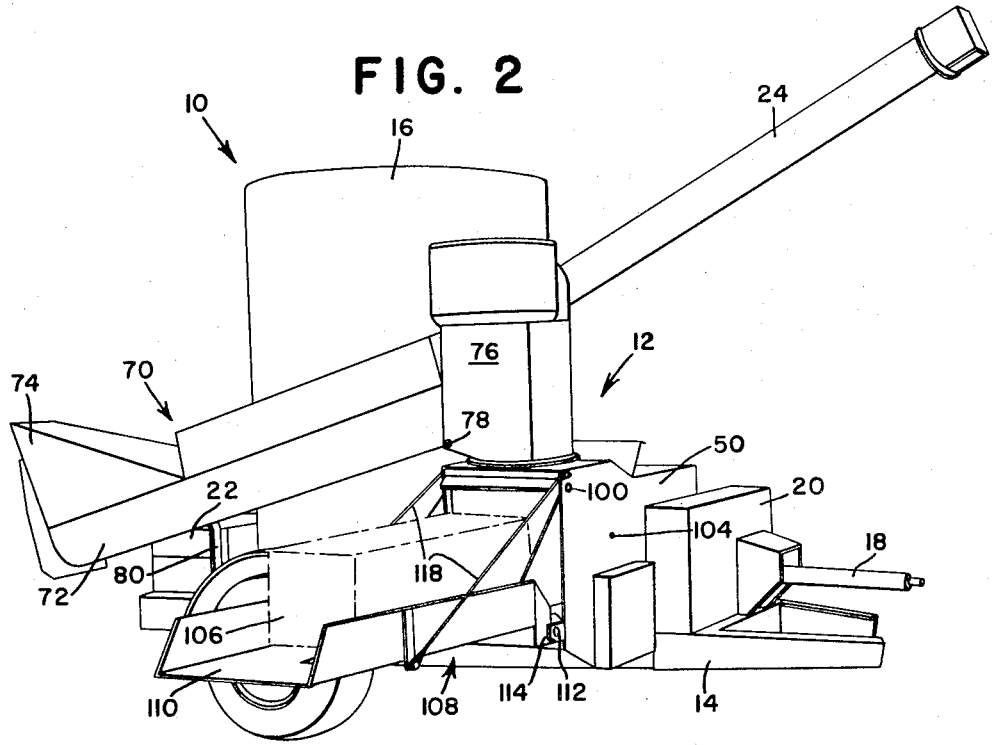
FIG. 2 is a view similar to FIG. 1 but showing the feed grinding apparatus arranged to grind bales.

Referring first to FIGS. 1 and 2 of the drawings, there is illustrated a portable feed grinder-mixer 10 incorporating the feed grinding apparatus 12 of the invention, the grinder-mixer including a mobile frame 14 having the feed grinding apparatus 12 mounted on its front portion and a flat bottomed, cylindrical mixing tank 16 of the type disclosed in U. S. Pat. 3,667,734 issued 6 June 1972 to Skromme et al mounted on its rear portion. Power for driving the various operating components on the machine, including those contained in the feed grinding apparatus to be subsequently described, is transmitted from a tractor power take-off shaft rearwardly by means of a longitudinal power shaft 18 to a front-mounted drive mechanism enclosed by a shield 20. Power is transmitted from the front-mounted drive mechanism to the various operating components by means not shown and not pertinent to the invention. As fully described in U. S. Pat. 3,667,734, the various feed constituents ground in the feed grinding apparatus 12 are delivered rearwardly to an inlet opening in the bottom of the tank 16, while feed supplements deposited in a rear-mounted hopper 22 are delivered forwardly to the same opening. The various constituents are thoroughly intermixed in the tank 16 by means of mixing apparatus contained therein, and the resulting mixture is then emptied from the tank through an elongated discharge auger 24.

Figure 3:
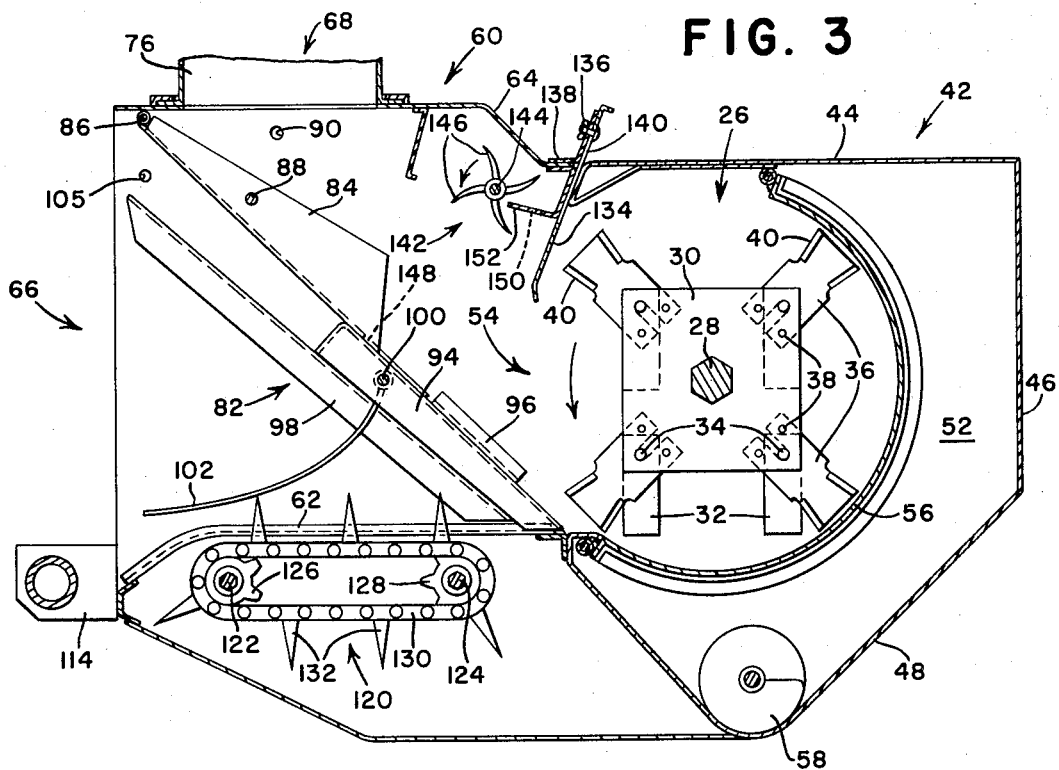
FIG. 3 is a right side elevational view of the feed grinding apparatus with the right side panel thereof removed for the sake of clarity, the apparatus being shown in its grain grinding configuration.
Figure 4:
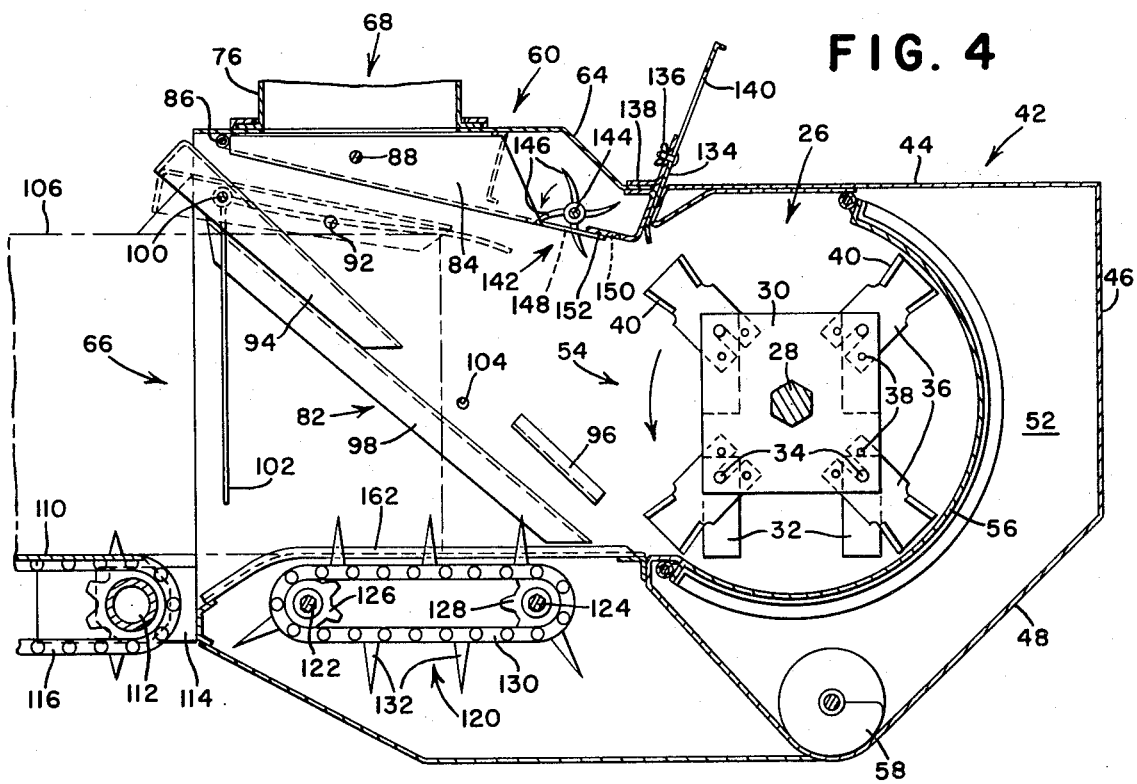
FIG. 4 is a view similar to FIG. 3 with the apparatus being shown in its bale grinding configuration.

The feed grinding apparatus 12 of the invention includes a rotor designated generally by the numeral 26 and comprising a hexagonal shaft 28 mounted on the machine for rotation about a transverse horizontal axis, the shaft having a plurality of transversely spaced plates 30 fixed thereto. A plurality of conventional swinging hammers 32 are mounted between the corners of the plates 30 on transverse rods 34, the latter being received in aligned apertures in the plates. Instead of swinging hammers, fixed knives 36 are mounted between the corners of several of the plates 30, the knives being fixedly mounted on the sides of the plates by means of fasteners 38. An important feature of the invention resides in the shape of the fixed knives 36. As shown in FIGS. 3 and 4, the sharpened leading edges 40 of these knives lie substantially on planes extending radially outwardly from the axis of the shaft 28. It has been found by applicants that this particular fixed knife configuration results in optimum bale feeding characteristics to the rotor 26.

The rotor 26 is substantially enclosed by a housing 42 formed by a horizontal top wall 44, a rear wall 46, a bottom wall 48 and right an left side walls 50 and 52, respectively. The front of the housing 42 is open at 54 to admit material to the rotor 26. In FIGS. 3 and 4, the right wall 50 has been removed to better illustrate the interior of the apparatus 12. Surrounding the rear and lower portions of the rotor 26 is an arcuate screen 56 having perforations therein through which the material ground by the rotor is discharged. After passing through the screen 56, the ground material settles to the bottom of the housing 42 where it is engaged by an auger 58 and conveyed transversely to the mixing tank 16.

A material-receiving chamber, designated generally by the numeral 60, is disposed forwardly of and in communicating relation with the rotor housing 42, the chamber 60 being formed by forwardly extending continuations of the rotor housing side walls 50 and 52, a floor 62 extending forwardly from the lower edge of the housing opening 54, and a top wall 64 extending forwardly from the housing top wall 44. THe walls and floor of the chamber 60 define a bale-receiving opening 66 at the front of the chamber, and the top wall 64 of the chamber has a circular grain-receiving opening 68 therein. A grain auger feeder 70, shown in its entirety in FIGS. 1 and 2, is mounted on the top wall 64 of the chamber 60 and is operative to convey grain upwardly and deposit it through the opening 68 into the chamber 60. The feeder 70 comprises an elongated through 72 having an auger (not shown) rotatably mounted therein, a hopper 74 formed on the outer end of the trough 72, and a generally cylindrical housing 76 rotatably mounted on the top wall 64 of the chamber in communicating relation with the grainreceiving opening 68 therein, the inner end of the trough being mounted on the housing 76 at 78 for vertical pivotal movement. In FIG. 1, the auger feeder 70 is shown in its operative position, with the outer end thereof resting on the ground forwardly of the chamber 60. Grain placed in the hopper 74 is delivered upwardly by the auger operating in the trough 72 and is deposited in the cylindrical housing 76 through which it falls into the material-receiving chamber 60. In FIG. 2, the auger feeder 70 is shown in its transport position alongside the mixing tank 16 where it is secured on an upright bracket 80.

Partition means, designated generally by the numeral 82, are contained in the chamber 60 to deflect grain deposited through the grain opening 68 downwardly and rearwardly through the chamber 60 and into the rotor housing 42 through the opening 54 therein. The partition means 82 comprises a first panel member 84 mounted on a pin 86 extending transversely between the chamber side walls 50 and 52 just forwardly of the opening 68 in the top wall 64, the panel 84 extending between the side walls 50 and 52 and being vertically swingable about the pin 86 between a lowered, grain position shown in FIG. 3 wherein the panel extends downwardly and rearwardly, and a raised, bale position shown in FIG. 4 wherein the panel extends generally horizontally rearwardly and substantially closes the grain opening 68. A pin 88, shown in cross section in FIGS. 3 and 4, is removably received by spaced apertures 90 and 92 in the left side wall 52 and by an aperture in the panel member 84 to retain the latter in its alternate positions.

The partition means 82 further comprises a second panel member 94 movable between a grain position shown in FIG. 3 and a bale position shown in FIG. 4, the panel member 94, when in the former position, extending downwardly and rearwardly from the lower terminal edge of the first panel member 84 to the lower edge of the opening 54 in the rotor housing 42. The second panel member 94, like the first panel member 84, extends between the side walls 50 and 52 of the chamber 60. An upper and lower pair of generally parallel, downwardly and rearwardly extending guide members 96 and 98, respectively, are fixed to each of the side walls 50 and 52, only the guide members on the left side wall 52 being shown in the drawings. In its grain position of FIG. 3, the second panel member 94 is disposed between the guide members 96 and 98 and is retained in position by means of a removable transverse pin 100. Swingably mounted on the pin 100, for a purpose that will subsequently appear, is a resilient flap 102 which, in the grain position of the panel member 94, extends downwardly and forwardly from the pin 100 across the forward portion of the chamber floor 62.

To convert the second panel member 94 from its grain position of FIG. 3 to its bale position of FIG. 4, the pin 100 is removed from the apertures 104 in the side walls, the panel member is moved up along the guide members 98 to the position shown in solid lines in FIG. 4, and the pin 100 is reinserted in apertures 105 in the side walls to swingably retain the member in position. In the bale positon of the panel member 94, the resilient flap 102 hangs straight downwardly from the pin 100 to substantially cover the bale opening 66 and thus prevent the expulsion of material therethrough.

As indicated by the dotted line positions of the panel member 94 and flap 102 in FIG. 4, these members are free to swing upwardly about the axis of the pin 100 when engaged by a bale as indicated at 106 as the latter is advanced rearwardly through the chamber 60 and into the rotor housing 42. A bale conveyor section 108, including a platform 110 pivotally connected at 112 to a pair of brackets 114 on the lower forward corners of the material-receiving chamber 60 and an endless chain conveyor element 116 for conveying bales rearwardly along the platform 110, is provided for receiving bales and delivering them through the bale opening 66 in the chamber 60. The conveyor section 108 is vertically swingable about the connection 112 between a lowered inoperative position shown in FIG. 1 and a raised operative position shown in FIG. 2. The section is held in the latter position by means of cables 118 which extend between the section and the upper forward corners of the chamber 60.

Once inside the chamber, the bales are engaged by a second endless chain conveyor element 120 in the floor 62 of the chamber and are conveyed thereby across the floor and into the rotor housing 42 through the opening 54 therein. The conveyor element 120 comprises fore-and-aft shafts 122 and 124 having sprockets 126 and 128, respectively, mounted thereon, and an endless chain 130 drivingly trained around the sprockets 126 and 128, the chain having a plurality of bale-engaging teeth 132 at spaced intervals along its length. The teeth 132 extend upwardly through a slot extending the length of the floor 62 to engage the bottom side of the bale 106. In the preferred embodiment of the invention, a plurality of transversely spaced sprockets 126 and 128 and chains 130 are provided on the shafts 122 and 124, the chains 130 operating beneath a like plurality of slots in the floor 62. Included in the drive means for the conveyor elements 116 and 120 is a clutch (not shown) by which the elements may be selectively driven. When the feed grinding apparatus 12 is arranged to grind grain as shown in FIGS. 1 and 3, the clutch in the drive to the elements 116 and 120 is disengaged. The clutch is engaged to drive the elements when the apparatus is arranged in its bale grinding configuration of FIGS. 2 and 4.

A gate 134, extending transversely between the side walls 50 and 52, is mounted for vertical adjustment at the juncture of the rotor housing top wall 44 and the chamber top wall 64. A screw having a wing nut 136 thereon is received in an aperture in an angle member 138 fixed to and extending upwardly and rearwardly from the rear edge of the top wall 64. The screw is also received by an elongated slot 140 in the gate 134, the slot permitting the gate to move between a lowered, grain position shown in FIG. 2 and a raised, bale position shown in FIG. 4. In the former position, the upper portion of the housing opening 54 is closed off to prevent the rotor knives from rejecting the grain fed into the housing. In the latter position, the opening 54 is of a maximum height to permit the bale 106 to pass therethrough into the housing 42.

To assist in feeding bales through the opening 54, and particularly bales that have a height greater than that of the opening, a rotary bale feeder mechanism 142 is provided in the chamber 60 just forwardly of the top edge of the opening 54. The mechanism 142 comprises a shaft 144 extending transversely between and rotatably supported in the side walls 50 and 52, and a plurality of transversely spaced wheels having radially extending, bale-engaging fingers 146 thereon. When arranged in its bale feeding configuration, the mechanism 142 of the grinding apparatus 12 is driven in the direction of the arrows in FIGS. 3 and 4 and is operative to engage and feed rearwardly through the opening 54 the upper portion of a bale as the latter is conveyed rearwardly through the chamber 60 by the conveyor elements 116 and 120. When driven in this manner, the fingers 146 pass through slots 148 in the lower end of the panel member 84 and slots 150 in a transverse support channel 152. The drive to the feeder mechanism 142, like the drive to the conveyor elements 116 and 120, includes a clutch (not shown) which may be engaged when the grinding apparatus is arranged in its bale grinding configuration and disengaged when the apparatus is arranged in its grain grinding configuration.

When arranged to grind grain, as shown in FIGS. 1 and 3 of the drawings, the bale conveyor section 108 of the grinding apparatus 12 may either be removed or merely swung downwardly about its connection 112 following removal of the support cables 118. The auger feeder 70 is positioned where desired, preferably as shown in FIG. 1 with the outer end thereof resting on the ground at a point forwardly of the chamber 60. The interior elements of the apparatus are arranged as shown in FIG. 3. The first panel member 84 is secured in its lower position by means of the pin 88, and the second panel member 94 is secured in its lower position by means of the pin 100. In addition, the gate 134 is secured in its lower position by the wing nut 136, and the clutches in the drive to the conveyor elements 116 and 120 and the feeder mechanism 142 are disengaged. Grain deposited in the hopper 74 of the auger feeder 70 is delivered upwardly by the auger to the housing 76, where it is discharged to fall downwardly into the chamber 60 through the opening 68 therein. The grain is deflected downwardly and rearwardly through the chamber 60 and into the housing 42 through the opening 54 therein by the partition means 82.

To convert from the grain grinding to the hay grinding configuration of the apparatus, the auger feeder 70 is swung to its transport position and secured by the bracket 80, and the bale conveyor section 108 is raised and secured by the cables 118, as shown in FIG. 2. The first panel member 84 of the partition means 82 is swung to its raised position and secured by the pin 88, the second panel member 94 is moved to its raised position and pivotally secured by the pin 100, and the adjustable gate 134 is raised to its maximum height position and secured by the wing nut 156. Finally, the clutches in the drive to the conveyor elements 116 and 120 and the feeder mechanism 142 are engaged to drive these members. A hay bale deposited on the conveyor section 108, as shown at 106 in FIG. 2, is thus conveyed rearwardly through the opening 66 in the chamber 60 by the conveyor element 108, causing the panel member 94 and flap 102 to swing upwardly as shown in dotted lines in FIG. 4. The bale is then engaged by the conveyor element 120 in the floor 62 of the chamber, which continues to convey it rearwardly into the housing 42 through the opening 54 therein. When adjacent to the opening 54, the upper portion of the bale is engaged by the fingers 146 of the feeder mechanism 142, the fingers being operative to convey the upper portion of the bale through the opening 54.

We claim:

1. Feed grinding apparatus comprising: a rotor including a shaft mounted for rotation about a transverse horizontal axis and having a plurality of grinding elements mounted thereon to rotate therewith; a housing for said rotor having an opening at its forward side to admit material thereinto; a material-receiving chamber on the front side of said housing defined by upright side walls extending forwardly from the sides of the opening in said housing and a floor extending forwardly from the lower edge of said opening, said chamber having a bale opening at its front side and a grain opening at its top side; selectively operable means for conveying a bale rearwardly through said chamber along the floor thereof and into said housing through the opening therein; and partition means removably positionable in the chamber to extend generally between the side walls thereof downwardly and rearwardly from a point adjacent to the front edge of the grain opening to a point adjacent to the lower edge of the opening in said housing, said partition when so positioned in said chamber being operative to deflect grain deposited through said grain opening downwardly and rearwardly through said chamber and into said housing through the opening therein.

2. The invention defined in claim 1 wherein said partition means includes a member pivotally connected to said chamber for swinging movement about a transverse horizontal axis disposed adjacent to the front edge of the grain opening between a lowered, grain position wherein said member extends generally between the side walls of said chamber from a point adjacent to the front edge of the grain opening downwardly and rearwardly toward the lower edge of the opening in said housing, said member when in its lowered position being operative to deflect grain deposited through said grain opening downwardly and rearwardly through said chamber toward the opening in said housing, and a raised, bale position wherein said member extends generally between the side walls of said chamber from a point adjacent to the front edge of the grain opening rearwardly beneath said grain opening, said member when in its raised position being operative to substantially close said grain opening.

3. The invention defined in claim 2 wherein said partition member, when in its lowered position, has a lower edge terminating short of the lower edge of the opening in said housing, and wherein said partition means comprises a second member releasably positionable in the chamber to extend generally between the side walls thereof downwardly and rearwardly from the lower terminal edge of said first-mentioned partition member to the lower edge of the opening in said housing.

4. The invention defined in claim 1 including bale feeder means mounted to rotate about a transverse horizontal axis adjacent to the upper edge of the opening in said housing and operative to engage and feed rearwardly through said opening the upper portion of a bale as the latter is conveyed rearwardly through said chamber.

5. The invention defined in claim 4 wherein said bale feeder means comprises a rotatable shaft extending transversely between the side walls of said chamber, and a plurality of transversely spaced wheels with radially extending fingers mounted on said shaft for rotation therewith, said fingers being operative to engage and feed rearwardly through the opening in the housing the upper portion of a bale as the latter is conveyed rearwardly through said chamber.

6. The invention defined in claim 5 wherein said partition means includes a member pivotally connected to said chamber for swinging movement about a transverse horizontal axis disposed adjacent to the front edge of the grain opening between a lowered, grain position wherein said member extends generally between the side walls of said chamber from a point adjacent to the front edge of the grain opening downwardly and rearwardly toward the lower edge of the opening in said housing, said member when in its lowered position being operative to deflect grain deposited through said grain opening downwardly and rearwardly through said chamber toward the opening in said housing, and a raised, bale position wherein said member extends generally between the side walls of said chamber from a point adjacent to the front edge of the grain opening rearwardly beneath said grain opening, said member when in its raised position being operative to substantially close said grain opening and being disposed in underlying relation to said bale feeder shaft and above the lowermost extent of said radial fingers, said member having a plurality of slots formed therein through which said fingers are movable.

7. The invention defined in claim 1 including a vertically adjustable gate extending generally transversely between the side walls of said housing and mounted adjacent to the top edge of the opening in said housing for adjusting the height of said opening, said gate being movable between a raised, bale feeding position and a lowered, grain feeding position.

8. The invention defined in claim 1 including selectively operable conveyor means in the floor of said chamber for conveying a bale rearwardly through said chamber.

9. The invention defined in claim 1 wherein the grinding elements mounted on the rotor shaft comprise a plurality of swinging hammers and a plurality of fixed, radially extending knives.

10. The invention defined in claim 1 wherein the grinding elements mounted on the rotor shaft include a plurality of fixed, radially extending knives, said knives having leading edges lying substantially on a plane extending radially outwardly from the axis of said shaft.

11. The invention defined in claim 1 wherein the grinding elements mounted on the rotor shaft include a plurality of fixed, radially extending knives, said knives having leading edges inclined inwardly and rearwardly relative to the direction of rotation of said rotor from a plane parallel to a radially extending plane but spaced forwardly therefrom relative to the direction of rotation of said rotor.

12. Feed grinding apparatus comprising: a rotor including a shaft mounted for rotation about a transverse horizontal axis and having a plurality of grinding elements mounted thereon to rotate therewith, said grinding elements comprising a plurality of swinging hammers and a plurality of fixed knives, said fixed knives having leading edges inclined inwardly and rearwardly relative to the direction of rotation of said rotor from a plane parallel to a radially extending plane but spaced forwardly therefrom relative to the direction of rotation of said rotor; a housing for said rotor having an opening at its forward side to admit material thereinto; and means on the front side of said housing for selectively directing either grain or bales rearwardly into said housing through the opening therein.

13. The invention defined in claim 12 wherein said means on the front side of said housing comprises a material-receiving chamber defined by upright side walls extending forwardly from the sides of the opening in said housing and a floor extending forwardly from the lower edge of said opening, said chamber having a bale opening at its front side and a grain opening at its top side; selectively operable means for conveying a bale rearwardly through said chamber along the floor thereof and into said housing through the opening therein; and partition means removably positionable in the chamber to extend generally between the side walls thereof downwardly and rearwardly from a point adjacent to the front edge of the grain opening to a point adjacent to the lower edge of the opening in said housing, said partition when so positioned in said chamber being operative to deflect grain deposited through said grain opening downwardly and rearwardly through said chamber and into said housing through the opening therein.

* * * * *